M. W. SHERMAN.
TRAILER COUPLING.
APPLICATION FILED JULY 11, 1917.

1,246,666.

Patented Nov. 13, 1917.

Murry W. Sherman
Inventor

By Geo. P. Kimmel
Attorney

UNITED STATES PATENT OFFICE.

MURRY W. SHERMAN, OF EVART, MICHIGAN.

TRAILER-COUPLING.

1,246,666.  Specification of Letters Patent.  Patented Nov. 13, 1917.

Application filed July 11, 1917. Serial No. 179,886.

*To all whom it may concern:*

Be it known that I, MURRY W. SHERMAN, a citizen of the United States, and resident of Evart, in the county of Osceola, in the State of Michigan, have invented certain new and useful Improvements in Trailer-Couplings, of which the following is a specification.

This invention relates to new and useful improvements in couplings, and more particularly to trailer couplings that are adapted to connect a plurality of vehicles with each other or with a tractor for holding purposes.

Another object of the invention is to provide a trailer coupling of this character which is so constructed, that it is applicable to various types of vehicles now in common use with very little trouble, whereby said vehicles are adapted to be attached to a tractor.

Still another object of the invention is to provide a device of this character which is easily and simply constructed, inexpensive to manufacture, and one which will be very efficient in operation.

With these and numerous other objects in view, my invention consists of the novel features of construction, combination and arrangement of parts which will be herein referred to and more particularly pointed out in the specification and claims.

In the accompanying drawings:—

In describing my invention I shall refer to the drawings in which similar reference characters designate like in corresponding parts throughout the several views.

Figure 1:
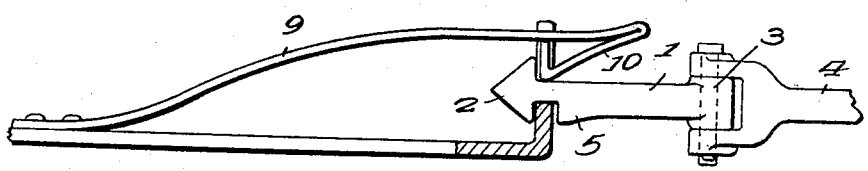
Figure 1 is a side elevation of the device.
Figure 2:
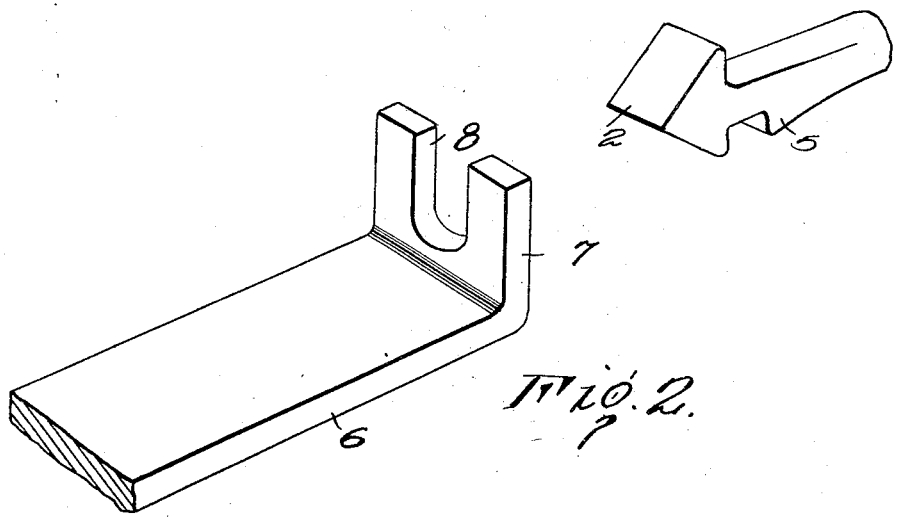
Fig. 2 is a detail perspective view of portions of the locking plate and coupling bar detached.

The device is formed in two parts, said parts being adapted to be secured to the vehicle, and tractor respectively, as desired, or to vehicles which it is desirable to couple. The device comprises a coupling bar 1, which is formed with an enlarged head 2, said coupling bar being pivoted as shown at 3 to a rod 4 that is connected with either the tractor or vehicle. The main portion of the coupling bar 1 is provided on its under side with a downwardly extending stop portion 5 for a purpose to be hereinafter more fully described.

The connecting means employed in the device comprises a metal strip 6, having an upwardly extending extremity 7, that forms a plate, and which has a U-shaped notch 8 forming the upper edge thereof. This strip may be secured to the vehicle or tractor, and on the upper side thereof is connected a flat spring 9, that is bent upwardly, and has its forward end extending across the upper portion of the notch 8. The extremity of the spring 9 is bent downwardly as shown at 10, and is disposed within said notch 8 adjacent the bottom edge thereof.

When the various parts of the coupling are assembled, and it is desired to connect a vehicle and tractor, the coupling bar 1 is forced in the notch 8, the enlarged head of the same forcing the spring 9 upwardly, and when said head has passed the plate 7 the downwardly extending locking portion 10 of the spring will drop down into position behind the head 2 to securely lock the same into engagement. This spring will also force the portion of the bar behind the head down against the bottom edge of the notch 8, as clearly shown in Fig. 1 of the drawings. The enlarged stop portion 5 on the coupling bar, will limit the movement of said bar, and tend to securely hold the same in locked engagement. To release the parts, it is only necessary to lift the spring 9, whereby the coupling bar may be raised slightly, and the head withdrawn through the notch 8. The spring may be lifted by any desired means.

This trailer coupling is very easy and simply constructed, and the various locking parts may be connected to either the tractor or trailer as desired. The coupling may be applied to various types of vehicles now in common use with very little trouble, and no material change to the structure of the vehicle being required. The coupling will lock automatically, when the bar 1 is forced in through the notch 8 in the plate 7, and said bar cannot be withdrawn until the spring 9 is raised. The locking engagement is made doubly secure, by the portion of the spring engaging behind the upper portion of the head 2, and the lower edge of the notch 8 being engaged behind the lower portion of said head.

From the above description taken in connection with the accompanying drawings, it is thought a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having fully described my invention, what I claim as new, and desire to secure by Letters Patent, is:—

1. A trailer coupling of the class described including a coupling bar having an enlarged head, a plate having a notched portion adapted to receive the said bar, a flat spring extending across the notch in said plate and spaced from the bottom edge thereof, and a downwardly extending portion on said spring adapted to spring into locked relation behind the head of the coupling bar when the same is moved through said notch.

2. A trailer coupling of the class described including a coupling bar having an enlarged head, a plate having a notched portion adapted to receive the said bar, a flat spring extending across the notch in said plate and spaced from the bottom thereof, locking means thereon adapted to engage the head of the coupling bar, and a stop on said bar adapted to engage the lower edge of the notch to limit the movement of the said bar.

In testimony whereof, I affix my signature hereto.

MURRY W. SHERMAN.

Copies of this patent may be obtained for five cents each, by addressing the "Commissioner of Patents, Washington, D. C."